US012687748B2

(12) United States Patent
Tsai

(10) Patent No.: US 12,687,748 B2
(45) Date of Patent: *Jul. 21, 2026

(54) LIQUID CRYSTAL DISPLAY DEVICE

(71) Applicant: AUO Corporation, Hsinchu City (TW)

(72) Inventor: Ruei-Hung Tsai, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 19/329,600

(22) Filed: Sep. 16, 2025

(65) Prior Publication Data

US 2026/0010035 A1 Jan. 8, 2026

Related U.S. Application Data

(63) Continuation of application No. 18/888,143, filed on Sep. 17, 2024, now Pat. No. 12,443,074.

(30) Foreign Application Priority Data

Sep. 26, 2023 (TW) .................................. 112136902

(51) Int. Cl.
G02F 1/13357 (2006.01)
G02F 1/1335 (2006.01)

(52) U.S. Cl.
CPC .. G02F 1/133611 (2013.01); G02F 1/133512 (2013.01); G02F 1/133603 (2013.01); G02F 1/133612 (2021.01)

(58) Field of Classification Search
CPC ......... G02F 1/133611; G02F 1/133612; G02F 1/133512; G02F 1/133603
See application file for complete search history.

(56) References Cited

U.S. PATENT DOCUMENTS

| | | | | |
|---|---|---|---|---|
| 2002/0044239 A1* | 4/2002 | Koyama | ........... | G02F 1/133512 349/110 |
| 2003/0016328 A1* | 1/2003 | Chung | .............. | G02F 1/134336 349/149 |
| 2003/0067569 A1* | 4/2003 | Chang | ............... | G02F 1/133512 349/106 |
| 2004/0032558 A1* | 2/2004 | Liu | ........................ | G02F 1/1339 349/153 |
| 2005/0151900 A1* | 7/2005 | Tsai | .................. | G02F 1/133512 349/110 |
| 2011/0194034 A1* | 8/2011 | Shimizu | ............... | G02B 6/0036 348/739 |
| 2015/0286089 A1* | 10/2015 | Soejima | ................ | G02F 1/1339 349/58 |

* cited by examiner

*Primary Examiner* — Christopher E Dunay
(74) *Attorney, Agent, or Firm* — JCIPRNET

(57) ABSTRACT

Disclosed is a liquid crystal display (LCD) device, including an LCD panel and a light-emitting diode (LED) light board. The LCD panel has a display area and a peripheral area located on at least one side of the display area. The LED light board overlaps the LCD panel in a normal direction of a light-emitting surface of the LCD panel. The LED light board includes a circuit substrate, multiple LEDs, and a resin layer. The circuit substrate overlaps the display area and the peripheral area in the normal direction of the light-emitting surface. The LEDs are arrayed on the circuit substrate. The LEDs overlap the display area in the normal direction of the light-emitting surface. The resin layer covers the circuit substrate and overlaps the display area and the peripheral area in the normal direction of the light-emitting surface.

14 Claims, 3 Drawing Sheets

LIQUID CRYSTAL DISPLAY DEVICE

CROSS-REFERENCE TO RELATED APPLICATION

This application is a continuation application of and claims the priority benefit of U.S. application Ser. No. 18/888,143, filed on Sep. 17, 2024, which claims the priority benefit of Taiwan application serial no. 112136902, filed on Sep. 26, 2023. The entirety of each of the above-mentioned patent applications is hereby incorporated by reference herein and made a part of this specification.

BACKGROUND

Technical Field

The disclosure relates to a liquid crystal display device.

Description of Related Art

Light-emitting diode (LED) technology, known for its high contrast, excellent color performance, and outstanding high resolution, is widely applied to various types of display devices, including televisions, smartphones, automotive displays, and head-mounted display devices. In liquid crystal display (LCD) devices, LED serves as an excellent light source. Compared to conventional cold-cathode fluorescent backlight modules, LED backlight modules offer superior local contrast and higher brightness. However, under current circumstances, LCD panels often face the problem of insufficient brightness at wide viewing angles, particularly at the edges of the display area. This can lead to insufficient edge brightness of the display screen, making it necessary to find a method to address the problem of insufficient edge brightness when using LEDs as backlight modules.

SUMMARY

The disclosure provides a liquid crystal display device to address a problem of insufficient edge brightness of a display screen.

In at least one embodiment of the disclosure, a liquid crystal display (LCD) device including an LCD panel and a light-emitting diode (LED) light board is provided. The LCD panel has a display area and a peripheral area located on at least one side of the display area. The LED light board overlaps the LCD panel in a normal direction of a light-emitting surface of the LCD panel. The LED light board includes a circuit substrate, multiple LEDs, and a resin layer. The circuit substrate overlaps the display area and the peripheral area in the normal direction of the light-emitting surface. The LEDs are arrayed on the circuit substrate. The LEDs overlap the display area in the normal direction of the light-emitting surface. The resin layer covers the circuit substrate and overlaps the display area and the peripheral area in the normal direction of the light-emitting surface.

Based on the above, the resin layer and the circuit substrate of the LED light board overlap the display area and the peripheral area in the normal direction of the light-emitting surface. Thus, light emitted by the LEDs overlapping the display area is reflected and/or refracted in the LED light board to the peripheral area, further achieving an effect of filling light in the peripheral area.

DESCRIPTION OF THE EMBODIMENTS

Figure 1A:
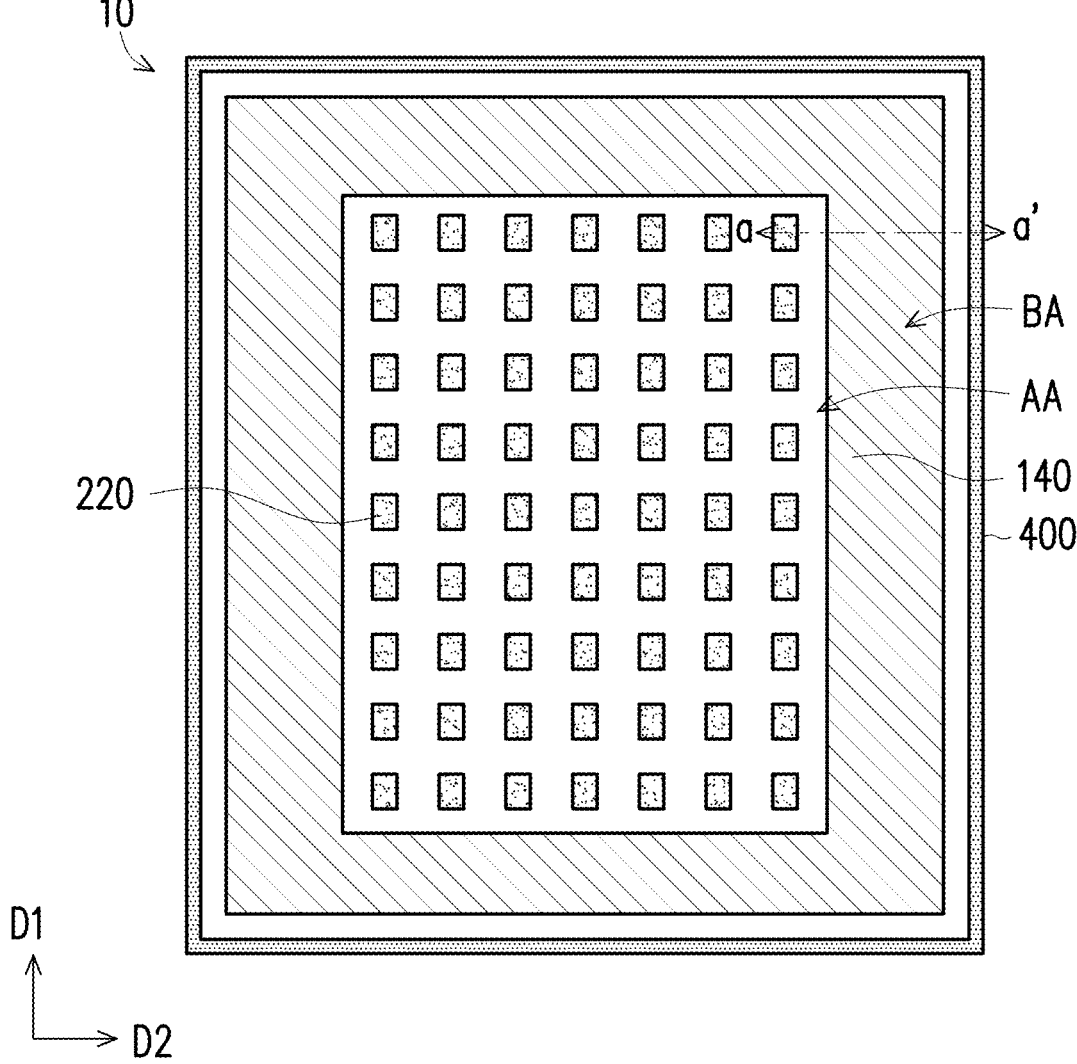
FIG. 1A is a top view schematic diagram of a liquid crystal display device according to an embodiment of the disclosure.
Figure 1B:
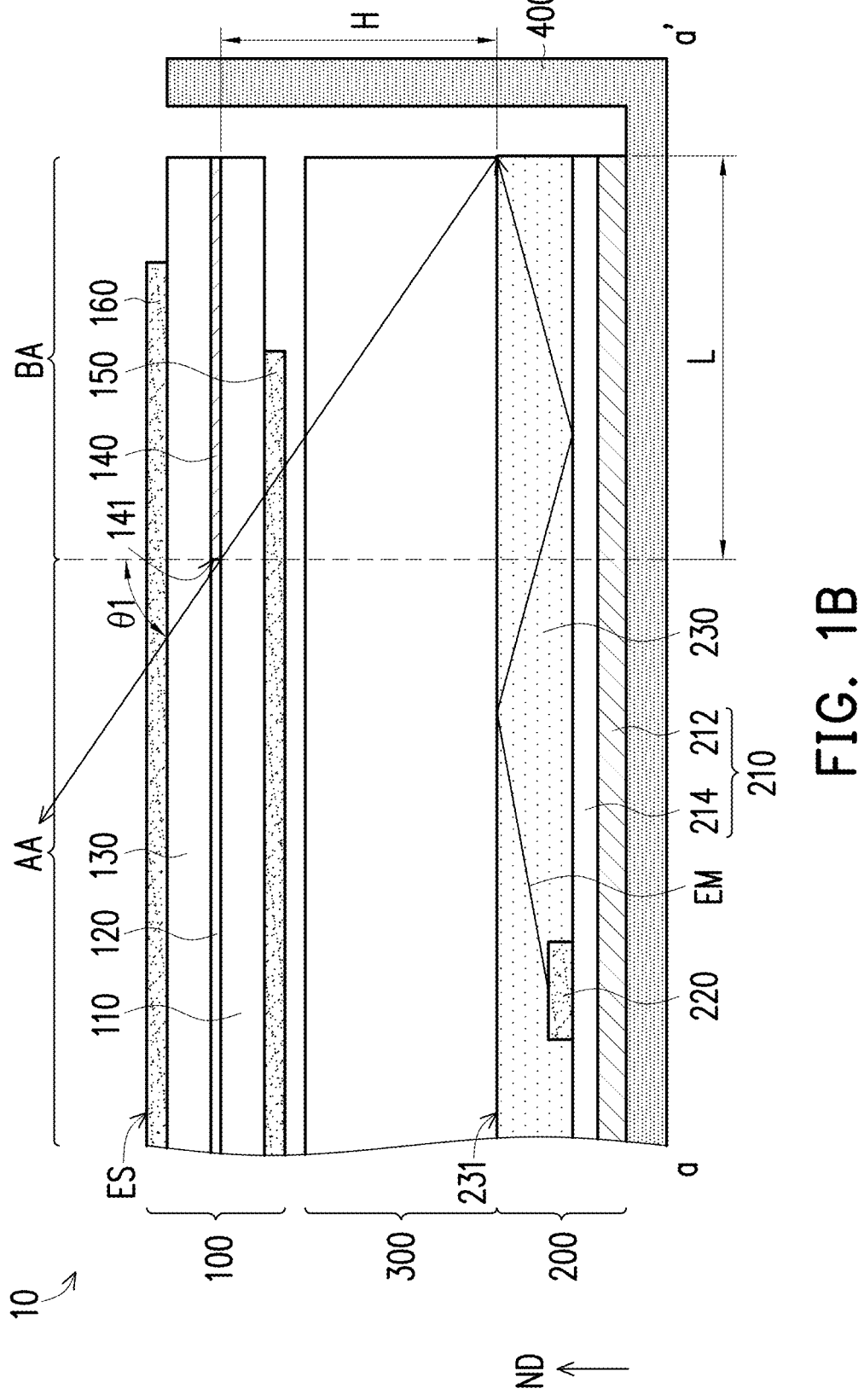
FIG. 1B is a cross-sectional schematic diagram taken along Line a-a' in FIG. 1A.
Figure 2A:
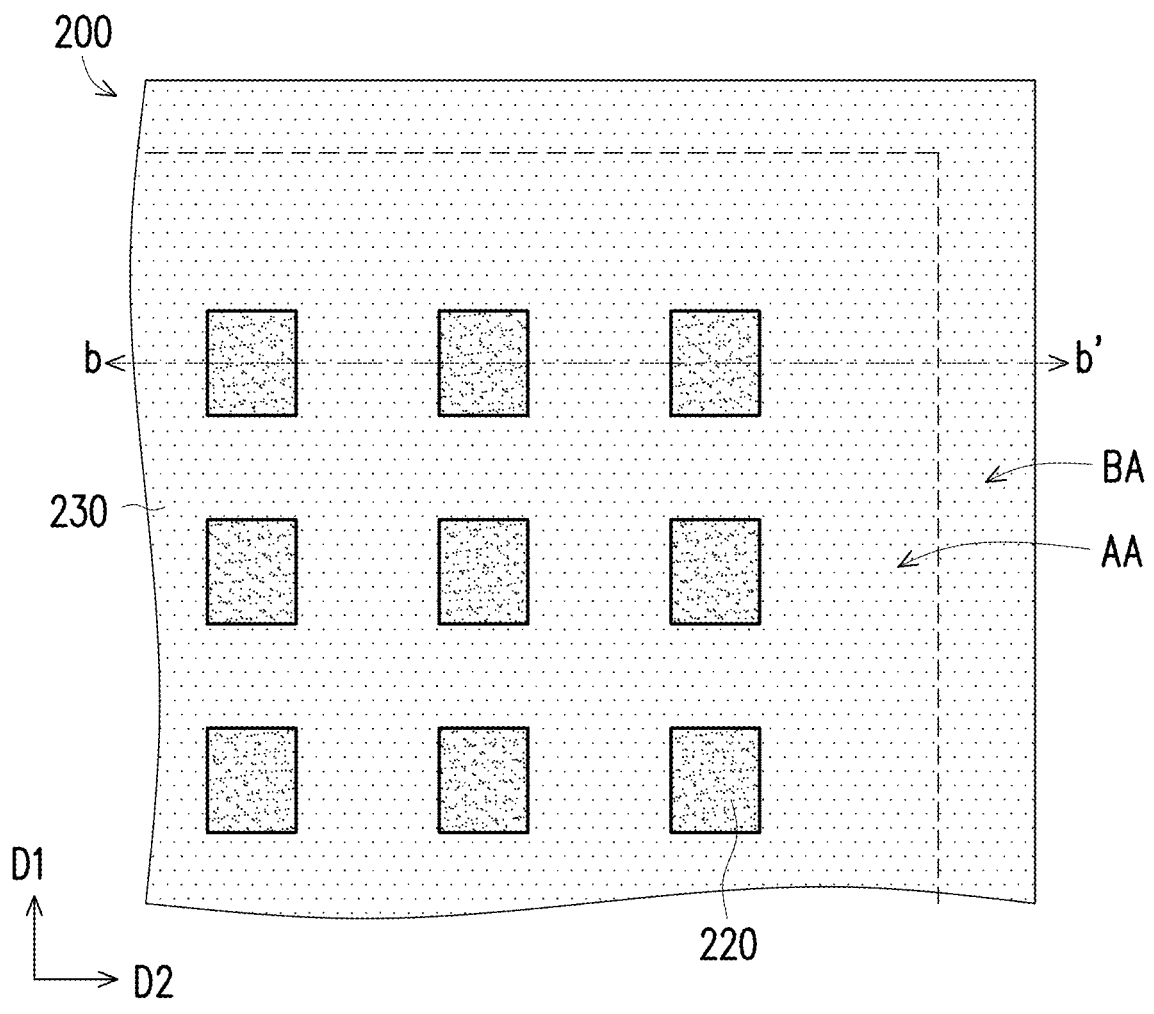
FIG. 2A is a partially enlarged top view schematic diagram of a light-emitting diode light board in FIG. 1B.
Figure 2B:
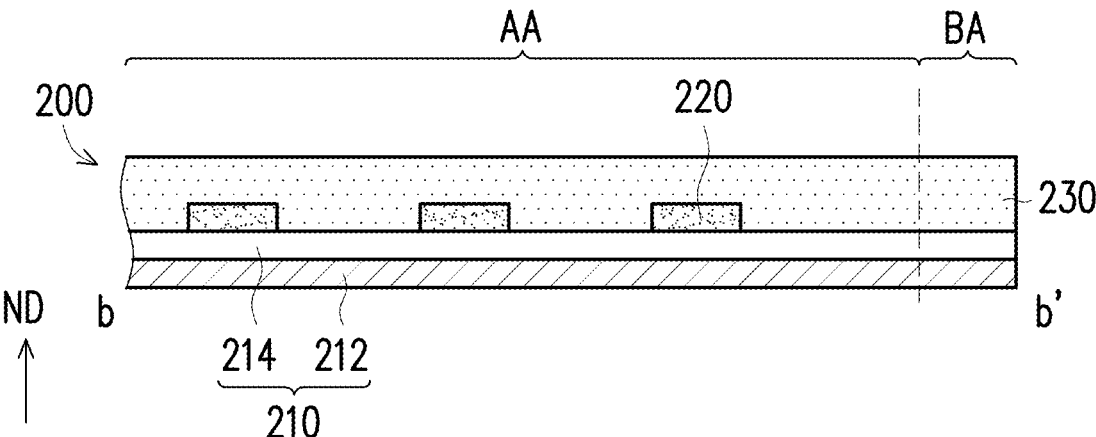
FIG. 2B is a cross-sectional schematic diagram taken along Line b-b' in FIG. 2A.

FIG. 1A is a top view schematic diagram of a liquid crystal display (LCD) device 10 according to an embodiment of the disclosure. For clarity, FIG. 1A illustrates a black matrix 140, a light-emitting diode (LED) 220, and a frame 400 while omitting other components. FIG. 1B is a cross-sectional schematic diagram taken along Line a-a' in FIG. 1A. FIG. 2A is a partially enlarged top view schematic diagram of an LED light board 200 in FIG. 1B. FIG. 2B is a cross-sectional schematic diagram taken along Line b-b' in FIG. 2A. Referring to FIGS. 1A to 2B, the LCD device 10 includes an LCD panel 100 and a backlight module. The backlight module includes the LED light board 200, an optical film set 300, and the frame 400 (e.g., an iron component). The optical film set 300 is located between the LCD panel 100 and the LED light board 200. The LCD panel 100, the LED light board 200, and the optical film set 300 are accommodated in the frame 400.

The LCD panel 100 has a display area AA and a peripheral area BA located on at least one side of the display area AA. In this embodiment, the peripheral area BA surrounds the display area AA. The LCD panel 100 includes a first substrate 110, a liquid crystal layer 120, a second substrate 130, the black matrix 140, a first polarizing structure 150, and a second polarizing structure 160.

In some embodiments, the first substrate 110 and the second substrate 130 are rigid substrates, materials of which may be glass, quartz, organic polymers, or other transparent materials. However, the disclosure is not limited thereto. In other embodiments, the first substrate 110 and the second substrate 130 may be flexible substrates or stretchable substrates. For example, materials of flexible substrates and stretchable substrates may be polyimide (PI), polydimethylsiloxane (PDMS), polyethylene terephthalate (PET), polyethylene naphthalate (PEN), polyester (PES), polymethylmethacrylate (PMMA), polycarbonate (PC), polyurethane (PU), or other suitable materials.

Between the first substrate 110 and the second substrate 130, a pixel array (not shown), a color conversion element (not shown), the liquid crystal layer 120, and the black matrix 140 are provided. The pixel array includes, for example, a thin-film transistor, a pixel electrode, and other active elements and/or passive elements. The color conversion element includes, for example, a quantum dot material used to change the wavelength (or color) of light, and a filter material for purifying light.

The black matrix 140 is formed on the first substrate 110. The black matrix 140 includes black resin, black metal, or other light-absorbing materials. The black matrix 140 defines the display area AA and the peripheral area BA. Specifically, light emitted by the LCD device 10 passes through the black matrix 140 in the display area AA. Thus, images that a user sees are formed by the light passing through the black matrix 140 in the display area AA. In some embodiments, the black matrix 140 includes mesh structures (not shown) disposed in the display area AA. The mesh structures are used to cover conductive lines (e.g., metal or semiconductor circuits) in the display area AA so as to prevent the conductive lines from bringing negative effects on the display screen. In some embodiments, the black matrix 140 in the display area AA may be used to separate color conversion elements for different colors, thereby reducing interference between light of different colors. The peripheral area BA is located outside the display area AA and is mostly covered by the black matrix 140. In this embodiment, the peripheral area BA is entirely covered by the black matrix 140. In other embodiments, a part of the peripheral area BA is not covered by the black matrix 140.

In some embodiments, the black matrix 140 is located on the pixel array, forming a black matrix on array (BOA) structure.

In some embodiments, the black matrix 140 includes an annular part surrounding the display area AA, with an inner surface 141 of the annular part being a boundary between the display area AA and the peripheral area BA.

The first polarizing structure 150 and the second polarizing structure 160 are disposed on the first substrate 110 and the second substrate 130, respectively. In some embodiments, the first polarizing structure 150 and the second polarizing structure 160 may include polyvinyl alcohol (PVA) polarizing films, triacetate cellulose (TAC) polarizing films, advanced polarization conversion films (APCF), or other polarizing structures. In some embodiments, the first polarizing structure 150 and the second polarizing structure 160 may also include metal wire-grid polarizing structures. In some embodiments, a transmission axis of the first polarizing structure 150 is different than a transmission axis of the second polarizing structure 160. For example, the transmission axis of the first polarizing structure 150 is perpendicular to the transmission axis of the second polarizing structure 160.

The optical film set 300 includes one or more types of optical thin films. The optical thin films are, for example, quantum dot enhancement films (QDEF), phosphor films, diffuser films, light guide films, prism films, dual brightness enhancement films (DBEF), diffraction films, or other optical thin films.

The LED light board 200 overlaps the LCD panel 100 in a normal direction ND of a light-emitting surface ES of the LCD panel 100. The LED light board 200 includes a circuit substrate 210, multiple LEDs 220, and a resin layer 230. In this embodiment, the backlight module (including the LED light board 200, the optical film set 300, and the frame 400) may be a direct type backlight module.

The circuit substrate 210 overlaps the display area AA and the peripheral area BA in the normal direction ND of the light-emitting surface ES. The circuit substrate 210 includes a base 212 and a circuit structure 214. The material of the base 212 includes metal, macromolecules, or other suitable materials. The base 212 extends continuously from under the display area AA to under the peripheral area BA. The circuit structure 214 is located on the base 212. In some embodiments, the circuit structure 214 includes wires and insulating structures surrounding the wires.

The LEDs 220 overlap the display area AA in the normal direction ND of the light-emitting surface ES. In some embodiments, the LEDs 220 do not overlap the peripheral area BA in the normal direction ND of the light-emitting surface ES. The LEDs 220 are arrayed on the circuit substrate 210, forming the LED light board 200. In the LED light board 200, the LEDs 220 on the same circuit substrate 210 are arranged in arrays along a first direction D1 and a second direction D2, which is perpendicular to the first direction D1. The circuit substrate 210 extends in the first direction D1 and the second direction D2, and the LEDs 220 arranged in arrays are electrically connected to the circuit structure 214 of the circuit substrate 210. In some embodiments, the LEDs 220 are bonded to the circuit structure 214 through solder, conductive adhesive, or other conductive bonding structures.

In this embodiment, the LED 220 is, for example, a micro LED or a mini LED. The LEDs 220 include a semiconductor stack (not individually shown) and multiple electrodes (not individually shown). The semiconductor stack (not individually shown) includes stacking layers of N-type semiconductors and P-type semiconductors. In some embodiments, a light-emitting layer is further included between the N-type semiconductors and the P-type semiconductors. The electrodes are formed on the N-type semiconductors and the P-type semiconductors, respectively.

The resin layer 230 covers the circuit substrate 210 and the LEDs 220, and overlaps the display area AA and the peripheral area BA in the normal direction ND of the light-emitting surface ES. In this embodiment, the resin layer 230 extends continuously from under the display area AA to under the peripheral area BA. In some embodiments, the material of the resin layer 230 is, for example, silicone, epoxy, optically clear adhesive, or other suitable materials.

In this embodiment, the LEDs 220 are disposed under the display area AA, but are not disposed under the peripheral area BA. A light EM emitted by the LED 220 near the peripheral area BA in a horizontal direction may be reflected and/or refracted in the LED light board 200 to an area under the peripheral area BA. For example, the light EM is reflected by an upper surface of the resin layer 230 and is then reflected by a surface or internal reflective structure (e.g., metal wires, reflective coatings, or diffusive particles) of the circuit structure 214. After leaving the LED light board 200, the light EM enters the LCD panel 100 in the display area AA and leaves the light-emitting surface ES at an angle $\theta 1$. In some embodiments, the angle $\theta 1$ is less than 90 degrees, such as between 30 degrees and 70 degrees. In some embodiments, a horizontal distance L between an edge of the resin layer 230 and an edge of the display area AA is greater than or equal to 0.5 times a vertical distance H between the black matrix 140 and an upper surface 231 of the resin layer 230. For example, the horizontal distance L ranges from 0.5 times the vertical distance H to 2.8 times the vertical distance H. If the horizontal distance L is less than 0.5 times the vertical distance H, a problem of insufficient brightness occurs.

In general, at wide viewing angles, the problem of insufficient edge brightness occurs to the display screen the user sees if the backlight module under the peripheral area BA does not emit light. In this embodiment, as the resin layer 230 and the circuit substrate 210 both extend under the peripheral area BA in the normal direction ND of the light-emitting surface ES, light can still be filled in the peripheral area BA even without disposing the LEDs 220 under the peripheral area BA. Thus, the cost of the LEDs 220 can be reduced while addressing the problem of insufficient edge brightness of the display screen at the same time.

What is claimed is:
1. A liquid crystal display device, comprising:
   a liquid crystal display panel, comprising:
      a first substrate;
      a second substrate; and
      a liquid crystal layer and a black matrix, located between the first substrate and the second substrate, wherein the black matrix defines a display area and a peripheral area; and
   a light-emitting diode light board, overlapping the liquid crystal display panel in a normal direction of a light- emitting surface of the liquid crystal display panel,
wherein the light-emitting diode light board comprises:
a circuit substrate, overlapping the display area and the
peripheral area in the normal direction of the light-
emitting surface of the liquid crystal display panel;
a plurality of light-emitting diodes, arrayed on the
circuit substrate, wherein the light-emitting diodes
overlap the display area in the normal direction of
the light-emitting surface of the liquid crystal display
panel, and the light-emitting diodes do not overlap
the peripheral area in the normal direction of the
light-emitting surface of the liquid crystal display
panel; and
a resin layer, covering a top surface of the circuit
substrate and overlapping the display area and the
peripheral area in the normal direction of the light-
emitting surface of the liquid crystal display panel,
wherein a horizontal distance between an edge of the
resin layer and an edge of the display area ranges
from 0.5 to 2.8 times a vertical distance between the
black matrix and an upper surface of the resin layer.

2. The liquid crystal display device of claim 1, wherein
the circuit substrate comprises:
a base; and
a circuit structure, located on the base, wherein the
light-emitting diodes are electrically connected to the
circuit structure, the circuit structure overlaps the dis-
play area in the normal direction, and the resin layer
covers the light-emitting diodes.

3. The liquid crystal display device of claim 1, wherein
the circuit substrate comprises:
a base, extending continuously from under the display
area to under the peripheral area; and
a circuit structure, located on the base, wherein the circuit
structure overlaps the display area in the normal direc-
tion of the light-emitting surface, and the light-emitting
diodes on the circuit substrate are arranged in an array
along a first direction and a second direction perpen-
dicular to the first direction, and the light-emitting
diodes arranged in the array are electrically connected
to the circuit structure.

4. The liquid crystal display device of claim 1, wherein
the resin layer covers the light-emitting diodes and extends
continuously from under the display area to under the
peripheral area.

5. The liquid crystal display device of claim 1, further
comprising:

an optical film set, located between the liquid crystal
display panel and the light-emitting diode light board;
and
a frame, wherein the light-emitting diode light board, the
optical film set, and the liquid crystal display panel are
accommodated in the frame.

6. The liquid crystal display device of claim 1, wherein
the liquid crystal display panel comprising:
a first polarizing structure, disposed on the first substrate,
wherein a portion of the first substrate is not shielded by
the first polarizing structure and overlaps the black
matrix in the normal direction; and
a second polarizing structure, disposed on the second
substrate, wherein a portion of the second substrate is
not shielded by the second polarizing structure and
overlaps the black matrix in the normal direction.

7. The liquid crystal display device of claim 1, wherein
a light emitted by one of the light-emitting diodes near the
peripheral area is transmitted in the resin layer from
below the display area to below the peripheral area, and
exits the resin layer from below the peripheral area.

8. The liquid crystal display device of claim 7, wherein
the light emitted by the one of the light-emitting diodes
enters the liquid crystal display panel and then leaves
the light-emitting surface of the liquid crystal display
panel at an angle being between 30 degrees and 70
degrees.

9. The liquid crystal display device of claim 1, wherein a
side surface of the resin layer and a side surface of the circuit
substrate are substantially aligned with each other.

10. The liquid crystal display device of claim 1, wherein
the circuit substrate comprises a base and a circuit structure
located on the base, and wherein a side surface of the resin
layer and a side surface of the base are substantially aligned
with each other.

11. The liquid crystal display device of claim 1, wherein
the circuit substrate comprises a base and a circuit structure
located on the base, the circuit structure comprises a plu-
rality of wires, the light-emitting diodes are bonded to the
circuit structure, and the resin layer completely covers a top
surface of the circuit structure.

12. The liquid crystal display device of claim 1, wherein
a material of the resin layer comprises silicone.

13. The liquid crystal display device of claim 1, wherein
a material of the resin layer comprises epoxy.

14. The liquid crystal display device of claim 1, wherein
a material of the resin layer comprises optically clear adhe-
sive.

* * * * *